G. F. VOIGHT.
SPRING SUSPENSION.
APPLICATION FILED MAR. 3, 1919.

1,381,523.

Patented June 14, 1921.
2 SHEETS—SHEET 1.

INVENTOR:
George F. Voight.

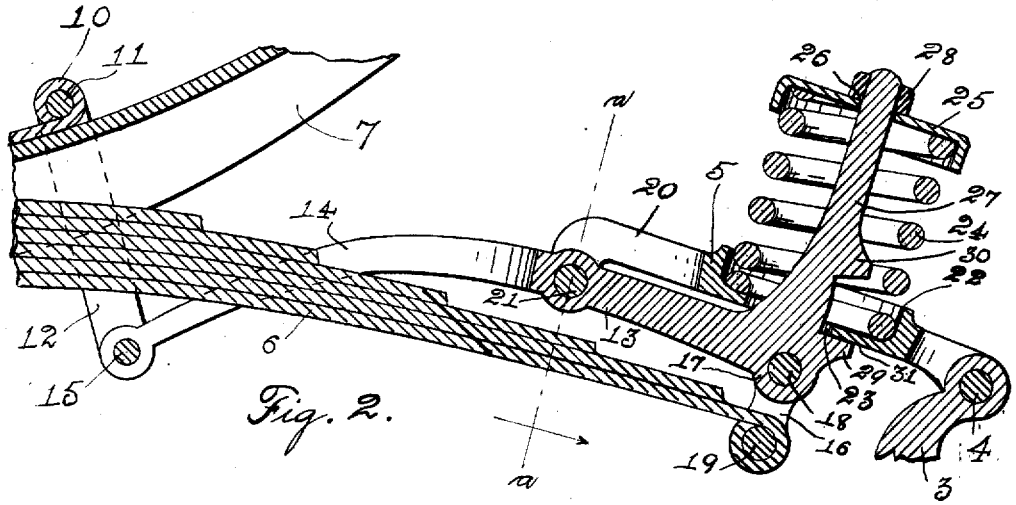
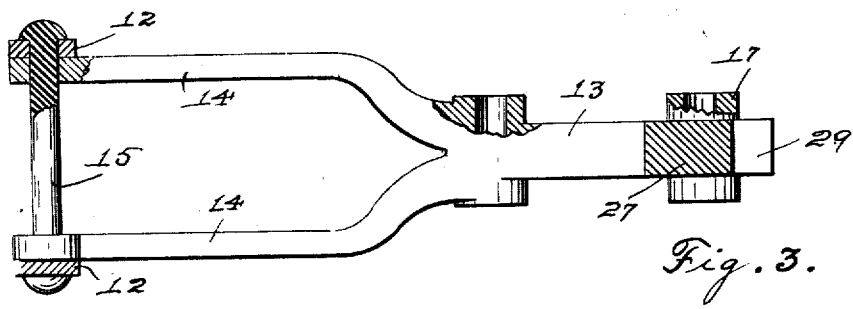
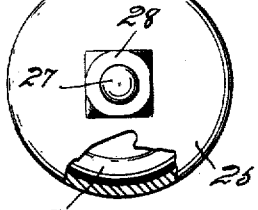
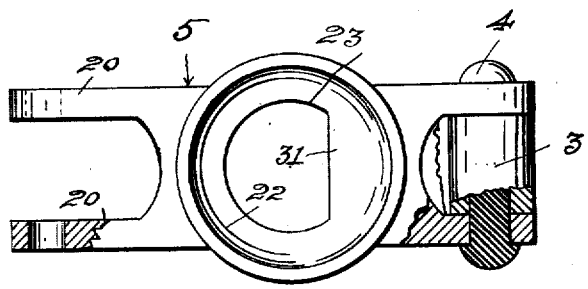
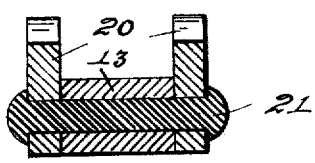

UNITED STATES PATENT OFFICE.

GEORGE F. VOIGHT, OF SAN FRANCISCO, CALIFORNIA, ASSIGNOR TO WALTER S. BURGESS, OF OAK PARK, ILLINOIS.

SPRING SUSPENSION.

1,381,523.

Specification of Letters Patent.   Patented June 14, 1921.

Application filed March 3, 1919.   Serial No. 280,214.

*To all whom it may concern:*

Be it known that I, GEORGE F. VOIGHT, a citizen of the United States, residing at San Francisco, in the county of San Francisco and State of California, have invented new and useful Improvements in Spring Suspensions, of which the following is a specification.

My invention relates to spring suspensions adapted to be applied to automobiles of the Ford type of construction.

An object of my invention is to provide yielding means adapted to be interposed between the ends of the vehicle's leaf springs and its axles, embodying primary and secondary levers working in conjunction with coil springs, for assisting the leaf springs in cushioning the vehicle against the unevenness of the road over which it may travel.

With the foregoing and other objects and purposes in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

In the drawings:

Fig. 2 is a sectional elevation of the device, showing also portions of the vehicle.

Fig. 3 is a plan view of a portion of the invention, portions being shown in section.

Fig. 4 is a plan view, with portions shown in section, of another portion of the invention.

Fig. 5 is a plan view of a portion of the device.

Fig. 6 is a sectional view on line *a—a*, Fig. 2.

Figure 1:
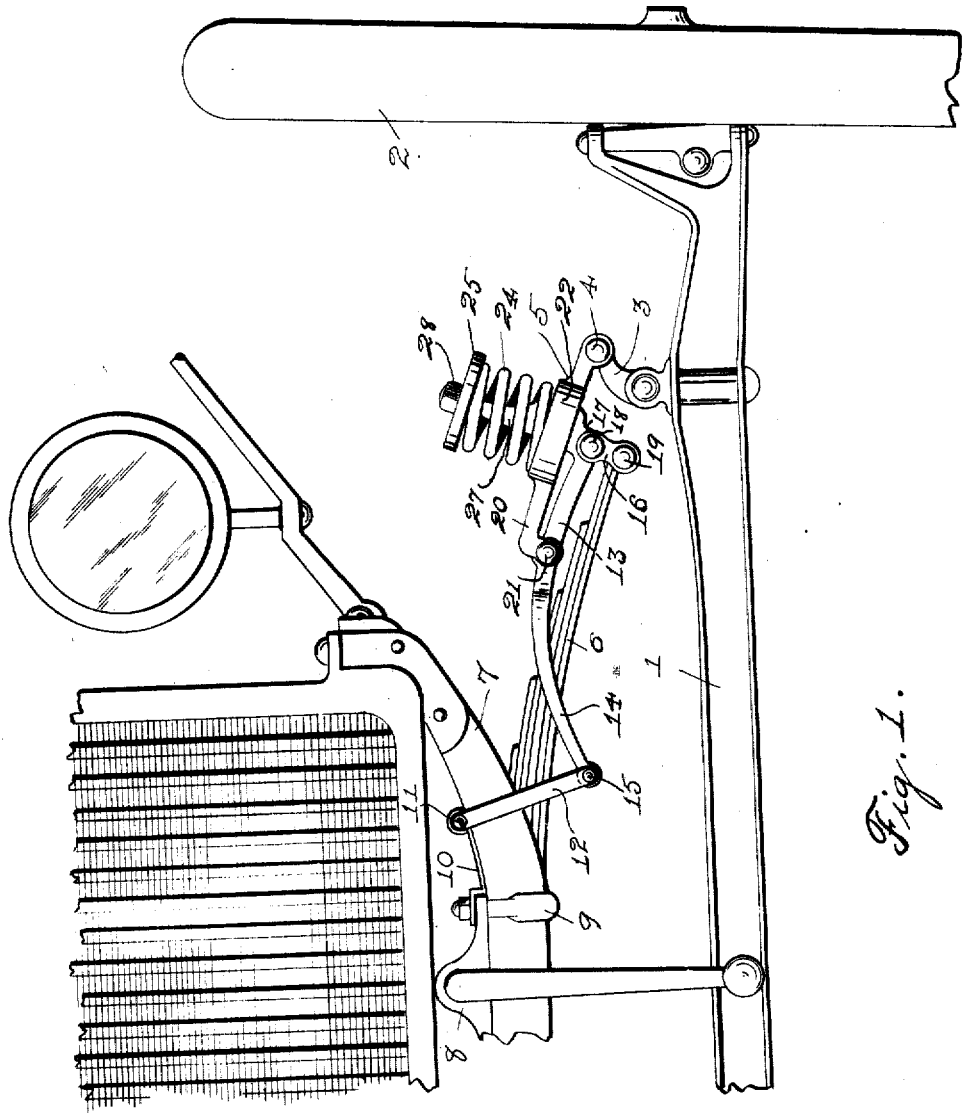
Figure 1 is a portion of the front end of an automobile with a unit of my invention applied to the left hand side thereof.

To facilitate in designating the relative positions of the various parts and members of the present invention, the term "inner end" or its synonyms, will indicate the end nearest to the median vertical plane extending longitudinally through the vehicle, and the term "outer end" or its equivalents, will indicate the end farthest away from said plane.

Like numerals of reference indicate like parts throughout the several views.

1 designates the front axle of a vehicle, supported at one end by a wheel 2, and supporting intermediate its ends a rigidly secured bracket 3 rotatably supporting a pivot pin 4 to which is attached the outer bifurcated end of a primary lever 5.

6 is the front leaf spring of the vehicle, which overhangs the axle 1 and extends in a general direction therewith.

7 designates a channel member disposed above the spring 6 and has a cap plate 8 rigidly clamped thereon by means of spring clip 9.

Upon the channel member 7, intermediate its outer end and the cap 8, is seated a saddle plate 10, which rotatably supports at its outer end a pivot pin 11, to the free ends of which are attached the upper ends of a pair of links 12. The inner end of the saddle plate may be secured to the clip 9.

13 designates a secondary lever having its inner end forked, thereby forming a pair of arms 14 disposed one on each side of the leaf spring 6 and free to move relatively thereto, the free ends of the arms being pivotally attached to a pivot pin 15 supported by the lower ends of the links 12. It is intended that the links 12 shall be oscillatable relatively to the arms 14 as well as to the saddle plate 10.

16 are the side links of a spring shackle, which have their upper ends pivotally attached to the outer end of the lever 13 as at 17, by means of a shackle pin 18, and their lower ends pivotally attached to the outer end of the leaf spring 6 by means of a shackle pin 19.

20 represents a pair of laterally spaced apart arms, which form the inner bifurcated end of the primary lever 5. The free ends of said arms being disposed one on each side of the lever 13 intermediate its ends, and pivotally attached thereto by means of a pivot pin 21.

22 designates a spring seat on the lever 5, which is provided with a central opening 23, and supports the lower end of a coil compression spring 24, which supports upon its upper end a cap or follower 25 provided with a central opening 26.

27 designates an integral stem portion on the upper side of the secondary lever 13, and extends upwardly through the opening 23, through the longitudinal opening of the coil spring 24, and through the opening 26, and is threadedly engaged above the cap 25 by a nut 28.

On one side of the stem 27 are a pair of spaced apart projections 29 and 30. The projection 29 is engageable with the lower side and the projection 30 with the upper side, of the primary lever 5 at 31, for limiting the upward and downward movements of the stem 27 relatively to the lever 5.

From the foregoing it can be seen that the outer end of the primary lever is pivotally supported by the axle of the vehicle, and that the inner end of the secondary lever is relatively movably supported by a portion of the vehicle frame, that the inner end of the primary lever is pivotally supported by an intermediate portion of the secondary lever and is movable relatively to its outer support, and that the outer end of the secondary lever is yieldingly supported relative to the primary lever by the coil spring, and that said arrangement may yieldingly form a support for the outer end of the leaf spring.

While I have shown, in the drawings, my invention as applied to the left hand side of the front end of an automobile, it is to be understood that it is applicable to the right hand as well as to the left hand side, and to the rear as well as to the front end of any machine.

I claim:

1. In combination, a rigid primary lever having a pivotal support for its outer end, a secondary lever having a relatively movable support for its inner end, a pivotal connection between the inner end of the primary lever and an intermediate part of the secondary lever, a resilient connection between other portions of said levers, and a shackle connection between one end of the vehicle's leaf spring.

2. In combination, a rigid primary lever having its outer end pivotally supported, a secondary lever having its inner end relatively movably supported, a pivotal connection between the inner end of the primary lever and an intermediate part of the secondary lever, and a resilient connection between other sections of the levers.

3. In combination, a rigid primary lever having its outer end pivotally supported, a secondary lever having its inner end swingingly supported, a pivotal connection between the inner end of the primary lever and an intermediate part of the secondary lever, and a coil spring connection between other portions of said levers.

4. In combination, a rigid primary lever, a pivotal support for its outer end, a secondary lever, a swinging link support for its inner end, a connection between the inner end of the primary lever and the secondary lever intermediate the ends of the latter, and a coil spring connection between the outer end of the secondary lever and the primary lever.

5. In combination, a support, a rigid primary lever having its outer end fulcrumed upon said support, a relatively movable support, a secondary lever having its inner end supported thereby, a pivot pin attached to an intermediate part of the secondary lever, said pivot pin supporting the inner end of said primary lever, a coil spring carried by said primary lever, and a connection between the outer end of the secondary lever and said coil spring.

6. A spring suspension comprising a rigid primary lever, a pivotal support for its outer end, a coil spring carried by said primary lever between its ends, a secondary lever, a support for its inner end, said support being movable relatively to said first named support, a pivot pin connection between the inner end of said primary lever and an intermediate part of said secondary lever, a connection between the outer end of said secondary lever and said coil spring whereby the latter may resiliently support the former, and a shackle connection between one end of the vehicle's leaf spring and the secondary lever adjacent its outer end.

7. The combination with a vehicle having an axle and a leaf spring, of a rigid primary lever pivotally supported by said axle, a secondary lever having its inner end supported by a portion of the vehicle subject to rebound, a pivotal connection between the inner end of the primary lever and an intermediate part of said secondary lever, a resilient connection between other portions of said levers, and a link connection between one end of said leaf spring and said secondary lever adjacent its outer end.

8. The combination with a vehicle having an axle and a leaf spring, of a primary lever having an outer bifurcated end, a pivotal connection between said bifurcated end and said axle, a coil spring having its lower end seated upon said lever, a secondary lever having its inner end supported by a portion of the vehicle movable relatively to the axle, the inner end of said primary lever being pivotally supported by said secondary lever intermediate its ends, the outer end of said secondary lever being resiliently supported by said coil spring, and a connection between one end of said leaf spring and said secondary lever adjacent the outer end of the latter.

9. The combination with a vehicle having an axle and a leaf spring, of a primary lever having an outer bifurcated end arranged to form a pair of spaced apart arms, a pivotal connection between the free ends of said arms and said axle, a coil compression spring having one end supported by said lever, a secondary lever having its inner end supported by a portion of the vehicle movable relatively to said axle, the outer end of said secondary lever being resiliently supported by said coil spring, the inner end of said primary lever being pivotally attached to said secondary lever intermediate the ends thereof, and a shackle connection between one end of said leaf spring and said secondary lever adjacent its outer end.

10. The combination with a vehicle having an axle and a leaf spring, of a primary lever having its outer end arranged to form a pair of arms, a pivotal connection between the free ends of said arms and said axle, a coil spring having one end seated upon said lever, a secondary lever having its outer end connected to the upper end of said coil spring, the inner end of said primary lever being pivotally attached to the secondary lever intermediate its ends, a swinging support for the inner end of said secondary lever and a portion of the vehicle movable relatively to said axle, and a shackle connection between one end of said leaf spring and the secondary lever.

11. The combination with a vehicle having an axle and a leaf spring, of a rigid primary lever having its outer end pivotally supported by said axle, a coil spring having its lower end supported by said lever, a pivot pin attached to the inner end of the lever, a secondary lever having its inner end supported by a portion of the vehicle subject to rebound, a portion of the secondary lever intermediate its ends being pivotally attached to said pivot pin, the outer end of said secondary lever being resiliently supported by said coil spring, and a shackle connection between one end and the leaf spring and said secondary lever.

12. The combination with a vehicle having an axle and a leaf spring, of a rigid primary lever having its outer end pivotally supported by said axle, a coil compression spring having one end supported by said lever, a secondary lever having its outer end resiliently supported by said coil spring, the inner end of said secondary lever terminating in a pair of arms disposed one on each side of said leaf spring, a connection between the free ends of said arms and a portion of the vehicle subject to rebound, a pivotal connection between the inner end of said primary lever and an intermediate part of the secondary lever, and a shackle connection between one end of said leaf spring and said secondary lever adjacent its outer end.

13. The combination with a vehicle having an axle and a leaf spring, of a rigid primary lever having its outer end pivotally supported by said axle, a coil spring having its lower end supported by said lever, a secondary lever having its inner end supported by a portion of the vehicle movable relatively to said axle, a pivotal connection between the inner end of the primary lever and the secondary lever intermediate its ends, a projection on the outer end of said secondary lever extending above the upper end of said coil spring and connected thereto, a shackle connection between one end of said leaf spring and said secondary lever adjacent its outer end.

14. The combination with a vehicle having an axle and a leaf spring, of a rigid primary lever having its outer end pivotally supported by said axle, a secondary lever having its inner end supported by a portion of the vehicle subject to rebound, a pivotal connection between the inner end of said primary lever and said secondary lever intermediate the ends thereof, a coil spring carried by said primary lever and adapted to resiliently support the outer end of said secondary lever, and a link connection between one end of said leaf spring and said secondary lever.

15. The combination with a vehicle having an axle supporting a bracket, and a leaf spring disposed above said axle and extending in a general direction therewith, of a rigid primary lever having its outer end pivotally attached to said bracket, a secondary lever having its inner end supported by a portion of the vehicle subject to rebound, a pivotal connection between the inner end of said primary lever and the secondary lever intermediate its ends, a coil spring supported by said primary lever, said coil spring being adapted to yieldingly support the outer end of said secondary lever, and a pivotal connection between one end of said leaf spring and said secondary lever.

16. The combination with a vehicle having an axle supporting a bracket, and a leaf spring disposed above said axle and extending in a general direction therewith, of a rigid primary lever having its outer end pivotally supported by said bracket, a secondary lever having its inner end supported by a portion of the vehicle subject to rebound, a pivotal connection between the inner end of said primary lever and the secondary lever intermediate the ends thereof, an integral stem projecting from the outer end of said secondary lever extending above said primary lever, a coil spring confined between the free end of said projection and said primary lever, and a connection between one end of said leaf spring and said secondary lever adjacent the outer end thereof.

17. The combination with a vehicle having an axle rigidly supporting a bracket, and a leaf spring disposed above said axle and extending in a general direction therewith, of a rigid primary lever having its outer end pivotally attached to said bracket, a rigid secondary lever having its inner end supported by a portion of the vehicle subject to rebound, a pivotal connection between the inner end of said primary lever and the secondary lever intermediate its ends, a coil spring seated upon said primary lever, an integral stem projecting from said secondary lever extending longitudinally through said coil spring to the upper end thereof, a connection between the free end of said projection and said upper end of the coil spring, and a shackle connection between one end of said leaf spring and said secondary lever.

18. The combination with a vehicle having an axle rigidly supporting a bracket, and a leaf spring disposed above said axle and extending in a general direction therewith, of a rigid primary lever having its outer end pivotally attached to said bracket, a rigid secondary lever having its inner end supported by a portion of the vehicle subject to rebound, a pivotal connection between the inner end of said primary lever and said secondary lever intermediate the ends thereof, a resilient connection between the outer end of said secondary lever and said primary lever intermediate the ends thereof, and a connection between one end of said leaf spring and said secondary lever.

19. The combination with a vehicle having an axle rigidly supporting a bracket, and a leaf spring disposed above said axle and extending in a general direction therewith, of a rigid primary lever having its outer end pivotally attached to said bracket, a secondary lever having its inner end supported by a portion of the vehicle subject to rebound, a pivotal connection between the inner end of said primary lever and said secondary lever intermediate its ends, a coil spring connection between the outer end of said secondary lever and the primary lever intermediate its ends, and a shackle connection between one end of said leaf spring and said secondary lever.

20. The combination with a vehicle having a bracket rigidly supported by an axle and a leaf spring disposed above said axle and extending in a general direction therewith, of a secondary lever having its inner end supported by a portion of the vehicle movable relatively to said axle, a rigid primary lever having its inner end pivotally attached to said secondary lever intermediate its ends and its outer end pivotally attached to said bracket, a spring seat on said primary lever, a spring seated thereon, an arm on said secondary lever projecting above said last named spring and having its free end connected thereto whereby said arm may be yieldingly supported by said last named spring, and a connection between one end of said leaf spring and said secondary lever adjacent its outer end.

21. The combination with a vehicle having a bracket rigidly supported by an axle and a leaf spring disposed above said axle and extending in a general direction therewith, of a secondary lever, a link connection between its inner end and a portion of the vehicle subject to rebound, a primary lever having its inner end pivotally attached to said secondary lever between its outer and inner ends and its outer end pivotally attached to said bracket, an integral arm or stem on said secondary lever projecting above said primary lever, a coil compression spring confined between the free end of said arm and said primary lever, means supported by said secondary lever engageable with said primary lever for limiting the downwardly movement of the outer end of the former relatively to the latter, and a connection between one end of said leaf spring and said secondary lever.

22. The combination with a vehicle having a rigid bracket supported by an axle and a leaf spring disposed above said axle and extending in a general direction therewith, of a secondary lever, a link connection between its inner end and the vehicle frame, a rigid primary lever having its outer end pivotally attached to said bracket and its inner end pivotally attached to said secondary lever between its ends, an integral stem projecting from said secondary lever adjacent its outer end, the free end of said projection terminating above said primary lever, a coil spring seated upon said primary lever, a connection between the free end of said projection and the upper end of said coil spring, means on said projection engageable with said primary lever for restricting the movement of said projection in one direction relatively to said primary lever, and a connection between one end of said leaf spring and said secondary lever adjacent its outer end.

23. The combination with a vehicle having a bracket rigidly supported by an axle and a leaf spring disposed above said axle and extending in a general direction therewith, a secondary lever having its inner end terminating in a pair of arms disposed one on each side of said leaf spring, a connection between the free ends of said arms and a portion of the vehicle subject to rebound, a rigid primary lever having an outer bifurcated end pivotally attached to said bracket and having its inner end pivotally attached to said secondary lever intermediate its ends, portions of the outer end of said secondary lever being disposed above and below said primary lever, a coil spring connection between one of said portions and said primary lever whereby said portion may move relatively to said primary lever against the tension of said coil spring, and a connection between the other of said portions and one end of said leaf spring.

24. The combination with a vehicle having a bracket rigidly supported by an axle intermediate its ends, and a leaf spring disposed above said axle and extending in a general direction therewith, of a secondary lever having its inner end diverging into a pair of arms disposed one on each side of said leaf spring and free to move relatively thereto, means for connecting the free ends of said arms to a portion of the vehicle vertically relative to said axle, a primary lever having its outer end terminating in a pair of laterally spaced apart arms, a pivotal connection between the free ends of said arms and said bracket, the inner end of said primary lever terminating in a pair of laterally spaced apart arms having their free ends pivotally attached to an intermediate part of said secondary lever, a portion of said secondary lever being disposed below said primary lever, an opening extending upwardly through said primary lever intermediate its ends, a projection on said portion of the secondary lever projecting upwardly through said opening, a coil compression spring seated upon said primary lever and encircling an intermediate portion of said projection, a connection between the free end of said projection and the upper end of said coil spring, the arrangement being such that said coil spring may resiliently support the outer end of said secondary lever, and a shackle connection between one end of said leaf spring and said portion of the secondary lever.

25. The combination with a vehicle having an axle, a bracket and a leaf spring disposed in the same vertical plane, the bracket being rigidly supported by the axle, of a secondary lever having a pair of laterally spaced apart arms at its inner end, said arms being disposed one on each side of said leaf spring and movable relatively thereto, an outer section of said lever being disposed above said leaf spring, a shackle connection between said lever adjacent its outer end and the outer end of said leaf spring, a rigid primary lever having its outer end terminating in a pair of laterally spaced apart arms having their free ends disposed one on each side of said bracket and pivotally attached thereto, the inner end of said primary lever being pivotally attached to an intermediate part of the secondary lever and a spiral compression spring supported by said primary lever and resiliently supporting the outer end of said secondary lever.

GEORGE F. VOIGHT.